July 9, 1957  E. L. BARCUS  2,798,913
DIRECTION SIGNAL CONTROL
Filed Oct. 23, 1952  3 Sheets-Sheet 1

Inventor
Edward L. Barcus
By Willits, Helmig & Baillio
Attorneys

July 9, 1957 — E. L. BARCUS — 2,798,913
DIRECTION SIGNAL CONTROL

Filed Oct. 23, 1952 — 3 Sheets-Sheet 2

Inventor
Edward L. Barcus
By Willito, Helmig & Baillio
Attorneys

July 9, 1957

E. L. BARCUS 2,798,913

DIRECTION SIGNAL CONTROL

Filed Oct. 23, 1952

Inventor
Edward L. Barcus

By Willits, Helwig & Baillio
Attorneys

United States Patent Office 2,798,913
Patented July 9, 1957

2,798,913

DIRECTION SIGNAL CONTROL

Edward L. Barcus, Anderson, Ind., assignor to General Motors Corporation, Detroit, Mich., a corporation of Delaware Application October 23, 1952, Serial No. 316,505

6 Claims. (Cl. 200—61.34)

This invention relates to direction signal control systems, and more particularly to manually set and automatically cancelled control mechanisms for such systems which are adapted for concentric disposition about the steering column of a motor vehicle.

One object of the invention is to provide a novel and highly improved direction signal control mechanism which is simple in construction, economic in manufacture, and highly efficient in operation.

Another object is to provide a direction signal control mechanism which is manually settable from a neutral position to either a right or left turn signal operating position and which is automatically released for return to neutral from either signal operating position by rotation of the steering wheel in a direction opposite that of the indicated turn.

A further object is to provide a mechanism of the type described which permits rotation of the steering wheel in a direction opposite that of the indicated turn without damage to the mechanism in the event that an obstruction or manual restraint interferes with the normal operation thereof.

Still another object is to provide a mechanism of the type described which eliminates the common tendency to overtravel the neutral position when automatically cancelled from a signal operating position by rapid rotation of the steering wheel.

These and other objects and advantages of the invention will become more fully apparent as reference is had to the accompanying drawings wherein.

Figure 1:
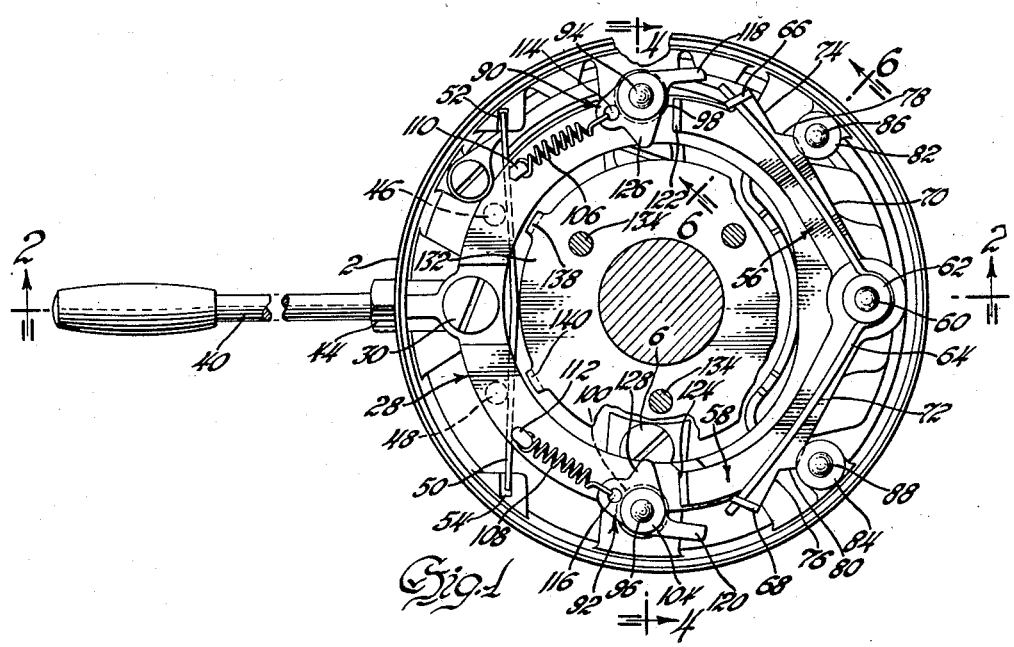
Figure 1 is a plan view, partly in section, of the direction signal control mechanism incorporating my invention, taken along the line 1—1 of Figure 2.
Figure 2:
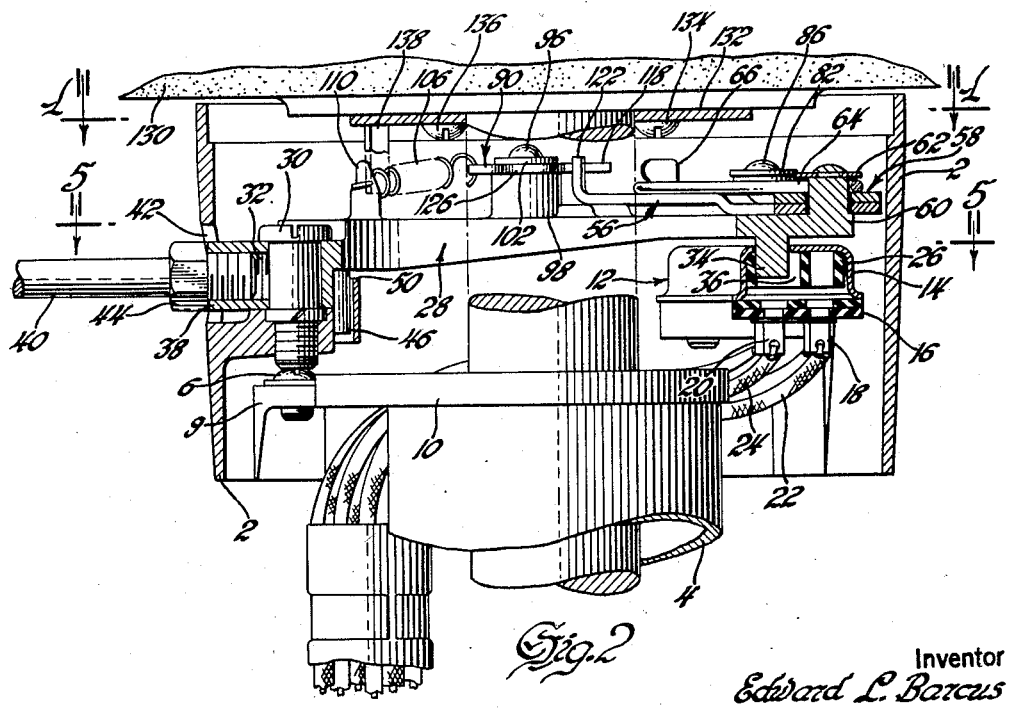
Figure 2 is an enlarged elevational view, partly in section, illustrating the operating mechanism and the manner in which it is arranged on the vehicle steering column adjacent the base of the steering wheel.

Referring now to the drawings and particularly Figures 1 and 2 there is illustrated an annular die-cast housing 2 concentrically disposed about the upper end of a steering column 4. Housing 2 is secured in position by threaded members 6 which pass through apertures 8 in the web portion 9 and threadably engage the flanged upper end 10 of the steering column 4. Recessed in the housing 2 at one side thereof is an electrical switch 12. Switch 12 comprises a hollow arcuate casing 14 having an insulated base member 16 secured at the bottom thereof. A plurality of contacts 18 and 20 are imbedded in base member 16 and are connected to signal lamps, not shown, by lead wires 22 and 24. A contact bridging member 26 is slidably disposed in the casing 14 and is adapted for movement therein from a central neutral position to contact bridging positions on either side of the neutral position.

A die-cast operating ring 28 is concentrically disposed within the housing 2 and is adapted for limited swingable movement about a pivot stud 30. Stud 30 extends through an aperture 32 in the ring 28 and is threadably secured in the housing 2 diametrically opposite the switch 12. On its lower surface, in vertical alignment with the switch 12, ring 28 is provided with an integral downwardly depending finger portion 34 which is adapted to extend into an elongated recess 36 in the contact bridging member 26 of switch 12 for actuating the bridging member in response to the swinging movement of said ring.

Adjacent pivot stud 30, the ring 28 is provided with an integral outwardly extending threaded socket portion 38 which is adapted to threadably receive a handle 40. Handle 40 extends inwardly through a slot 42 in the housing 2. A locknut 44, carried by the handle 40, is thereafter tightly drawn against the face of socket portion 38 to prevent subsequent loosening of the handle 40. Formed integrally on ring 28 and depending downwardly therefrom at each side of pivot stud 30 are laterally aligned lugs 46 and 48 which are adapted to bear against a transverse blade spring 50, the respective ends of which are secured in slotted bosses 52 and 54 formed in the housing 2. It will be seen that the position of the downwardly depending lugs 46 and 48 with reference to the blade spring 50 will tend to center the ring 28 in a neutral position since rotation of the ring 28 in either direction from neutral will deflect blade spring 50, causing greater pressure on one lug and reduced pressure on the other. However, when the ring is in a neutral position the blade spring 50 will exert equal pressure on each of the downwardly depending lugs 46 and 48.

To temporarily restrain ring 28 in either of its signal operating positions, a pair of arm-like latch members 56 and 58 are swingably secured on a common pivot member 60 which is integral with and extends upwardly from ring 28 diametrically opposite pivot stud 30. Latch members 56 and 58 are disposed on pivot member 60 in overlapping relation and secured against axial shifting by a washer 62 which is retained in position by peening over the end of member 60. A wire spring 64 encircles the rear edge of pivot member 60 between washer 62 and latch member 56 and extends outwardly to engage upturned indented spring retainers 66 and 68 formed on latch members 56 and 58. On their rear edges the latch members 56 and 58 are formed with straight guiding edges 70 and 72, respectively, which are stepped inwardly at 74 and 76 to form notched shoulders 78 and 80. As the ring 28 is swung within the housing 2, the latch members 56 and 58 carried by the ring, maintain sliding and rolling contact with guide rollers 82 and 84, respectively, which are rotatably secured in the housing 2 on pivot shafts 86 and 88 formed thereon. It will be seen that as the latch members 56 and 58 move with the ring, the guiding edges 70 and 72 move slidably along guide rollers 82 and 84, respectively. When the ring is swung, as for example, to the full left position, the guiding edge 72 of latch member 58 will move along guide roller 84 until the notched shoulder 80 reaches the guide roller 84. Simultaneously the guiding edge 70 of latch member 56 also moves along guide roller 82 until the inner extremity of said guiding edge reaches roller 82. Since latch members 56 and 58 are spring biased to bear against rollers 80 and 82, respectively, latch member 58 will swing angularly outwardly bringing its notched shoulder 80 into engagement with the roller 84 thereby preventing the ring 28 from returning to the neutral position. It will be understood that when the ring is initially swung to the full right position, notched shoulder 78 of latch 56 will similarly prevent the return of the ring to neutral.

In order to release either latch arm 56 or 58 and permit the ring 28 to return to the neutral position, a pair of release pawls 90 and 92 are rotatably mounted on the upper surface of ring 28, substanitally midway between switch 12 and pivot stud 30. Release pawls 90 and 92 rotate about stud portions 94 and 96, respectively, of bosses 98 and 100 on the ring 28, and are secured against axial shifting by washers 102 and 104 which in turn are retained by peening over the heads of the studs 94 and 96. Pawls 90 and 92 are yieldably retained in predetermined angular positions by coil springs 106 and 108, respectively. Coil springs 106 and 108 are connected at one end thereof to anchor members 110 and 112, respectively, and their other ends are hooked into apertures 114 and 116 formed in their respective pawls 90 and 92. Release pawls 90 and 92 are yieldably rotatable in either direction against the centering action of springs 106 and 108 and are provided with finger extensions 118 and 120, respectively. Finger extensions 118 and 120 are adapted to engage the upturned outer extremities 122 and 124, respectively, of latch members 56 and 58 when rotated inwardly toward the center of the housing 2. It will be apparent that clockwise rotation of release pawl 90 will cause finger extension 118 to bear against and swing latch arm 56 inwardly to release the locking action of notched shoulder 78 and roller 82, thereby permitting the ring 28 to return to the neutral position in response to the pressure of blade spring 50. Conversely, counterclockwise rotation of release pawl 92 will cause latch arm 58 to swing inwardly and release the ring 28 for return to the neutral position. To provide for steering wheel actuation of release pawls 90 and 92, a knockout plate 132 is secured to the base of the steering wheel 130 by machine screws 134 and is provided with a pair of downwardly depending lugs 138 and 140 which rotate in an unobstructed circular path when the ring 28 is in the neutral position. It will, of course, be apparent that the latching effect of either notch 78 or 80 may also be overcome by manual pressure on handle 40.

When the ring 28 is moved to the right signal operating position, the lobe 126 formed on pawl 90 will be moved inwardly sufficiently to intersect the circular path of depending lugs 138 and 140 and when the ring is moved to the left signal operating position the lobe 128 formed on pawl 92 will be moved inwardly sufficiently to intersect the circular path of depending lugs 138 and 140. When the ring 28 is in the right signal operating position it will be seen that counterclockwise rotation of pawl 90 is resisted only by spring 106 while clockwise rotating of pawl 90 will cause finger extension 118 to bear against latch 56 to swing the notched shoulder 78 out of engagement with roller 82 and permit the ring 28 to return to neutral. Conversely when the ring 28 is in the left signal operating position clockwise rotation of pawl 92 is resisted only by spring 108, while counterclockwise rotation of pawl 92 will cause finger extension 120 to bear against latch 58 to swing the notched shoulder 80 out of engagement with roller 84 and permit the ring to return to neutral.

Figure 3:
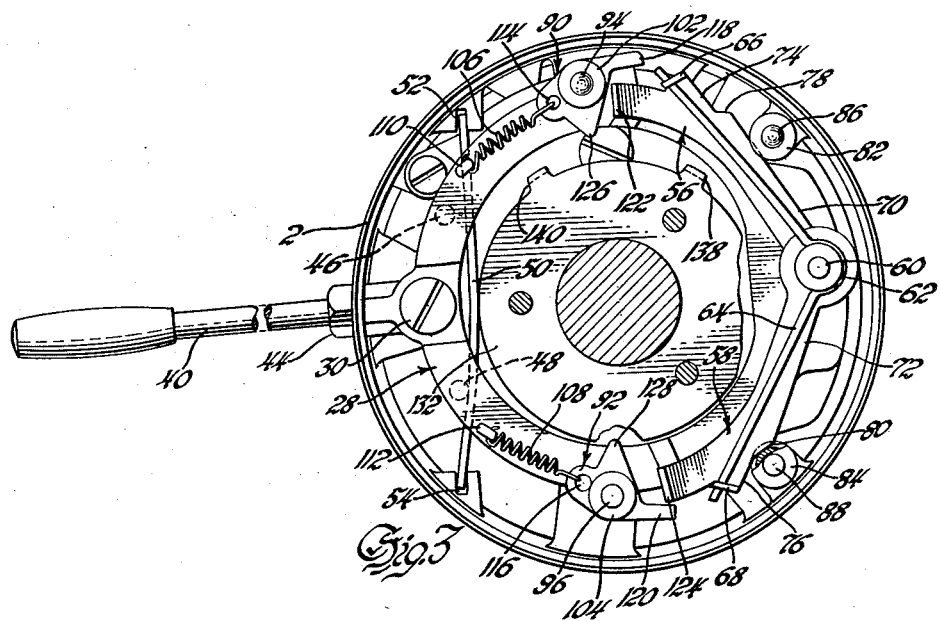
Figure 3 is a view similar to Figure 1 showing the control mechanism in one of its signal operating positions.
Figure 4:
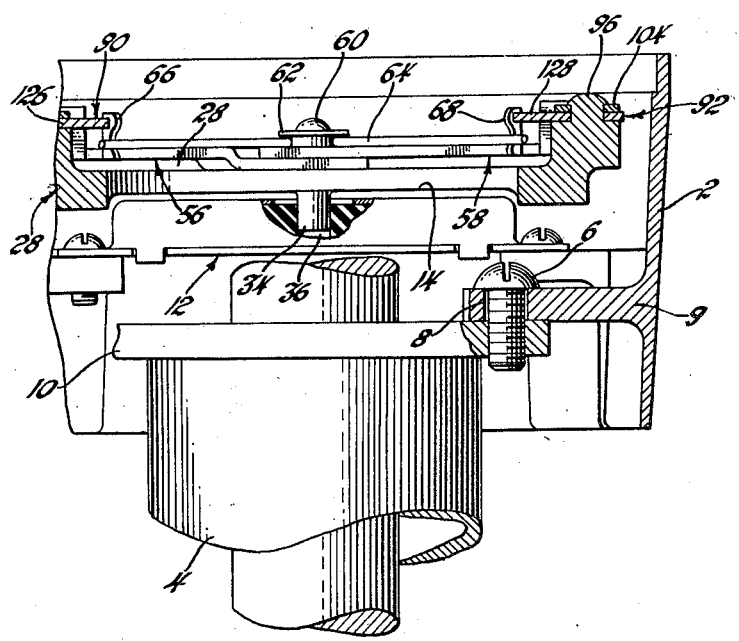
Figure 4 is a fragmentary enlarged elevational view, partly in section, taken substantially along line 4—4 of Figure 1.
Figure 5:
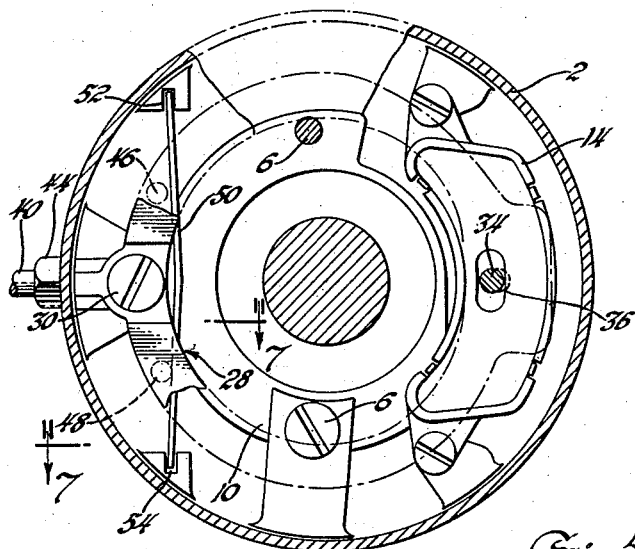
Figure 5 is a plan view, partly in section, taken substantially along line 5—5 of Figure 2.
Figure 6:
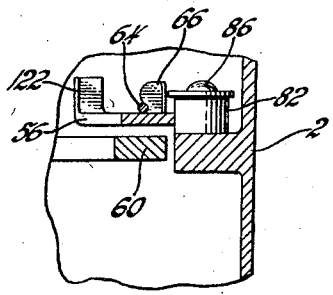
Figure 6 is a fragmentary enlarged elevational view of a section of the mechanism taken substantially along line 6—6 of Figure 1.
Figure 7:
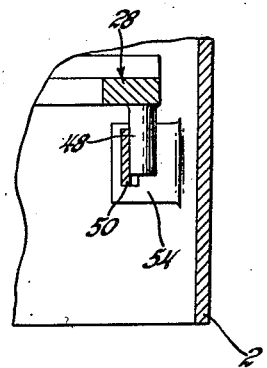
Figure 7 is an enlarged fragmentary view, partly in section, taken substantially along line 7—7 of Figure 5.

The operation of the mechanism, as for instance to indicate a left turn, is as follows: handle 40 is moved counterclockwise from the position shown in Figure 1 to the position shown in Figure 3, causing ring 28 to swing arcuately across housing 2 against the pressure of blade spring 50, to position switch 12 in the left signal operating position. Simultaneously, pawl 92 carried by the ring 28 is moved into the circular orbit of knockout plate 132 and latch arm 58, also carried by the ring 28, swings outwardly in response to the urging of the spring 64 causing notched shoulder 80 to engage roller 84, thereby preventing ring 28 from returning to the neutral position. As the operator initiates the left turn by rotating the steering wheel 130 in a counterclockwise direction, the depending lugs 138 and 140 of knockout plate 132 approach and bear against the lobe 128 of pawl 92. Continued circular movement of depending lugs 138 and 140 cause pawl 92 to yieldably rotate in a clockwise direction until the lobe 128 has moved an angular distance sufficient to clear the circular path of depending fingers 138 and 140. Since this action is duplicated with each successive complete revolution of steering wheel 130, the signal will not be cancelled by additional turns of the wheel in the direction of the indicated turn. After completing the turn, the operator imparts reverse or clockwise direction of rotation to the steering wheel 130 to straighten the vehicle along the new path of travel. Upon reversal of rotation of the steering wheel 130 the depending lugs 138 and 140 of the knockout plate 132 approach from the opposite direction to bear against and rotate lobe 128 in a counterclockwise direction, causing the finger extension 120 of pawl 92 to move angularly inwardly and engage the upturned extremity 124 of latch arm 58. Continued rotation of pawl 92 causes latch arm 58 to swing inwardly about pivot 60, disengaging notched shoulder 80 and roller 84 to permit the ring 28 and switch 12 to return to the neutral position. However, if for any reason the handle 40 is forcibly retained in the left turn signal operating position while rotating the steering wheel in the opposing direction, no damage to the mechanism will result. The additional counterclockwise rotation of pawl 92 necessary to clear the circular path of the depending fingers 138 and 140 requires only that the pressure of depending lugs 138 and 140 on the lobe 128 be greater than the resistance of spring 64 against latch arm 58, since the latch arm 58 is yieldably swingable inwardly a distance sufficient to permit the necessary additional rotation of pawl 92. It will be understood that the sequence of operation for a right turn is identical, except in a reverse sense.

From the foregoing description it is seen that an improved and simplified mechanism has been devised which is smooth and silent in operation and which is not susceptible to damage from inadvertent operation or transient obstructions.

While but a single embodiment has been shown and described, it is to be understood that other modifications may be adopted without departing from the invention. It is to be understood therefore that it is not intended to limit the invention to the single embodiment shown but only by the scope of the claims which follow.

What I claim and desire to secure by Letters Patent of the United States is:

1. In a device of the class described, the combination of a steering wheel having depending lugs secured thereon, a fixed support adjacent said steering wheel, switch means secured in said housing, said switch means being adapted for manual movement from a neutral position to circuit closing positions at either side of said neutral position, an operating ring pivotally mounted on said support and adapted for engagement with said switch, means mounted on said support for urging said ring to a central neutral position, a pair of rollers secured on said support, means on said ring coacting with said rollers for temporarily retaining said ring in positions disposed at either side of said neutral position, additional means on said ring coacting with said depending lugs when said ring is in either the right or left position to release said ring for return to the neutral position.

2. In a device of the class described, the combination of a steering shaft having a steering wheel secured at one end thereof, depending lug means secured on said steering wheel, a steering column disposed about said steering shaft, a shallow housing disposed concentrically on said column axially adjacent said steering wheel, a multi-positioned switch recessed in said housing at one side thereof, ring means swingably mounted in said housing for actuating said switch, yieldable means secured in said housing for urging said ring to a central neutral position, detent means for retaining said ring to the right or left of said central position, said detent means including a pair of spring biased arms pivotally mounted on said ring, a pair of rollers mounted on said housing operatively associated with said arms, a notched shoulder portion provided on each of said arms and so disposed thereon that one of said shoulder portions resiliently engages one of said rollers when said ring is adjusted to the right of said central position and the other of said notched shoulder portions resiliently engages the other of said rollers when said ring is adjusted to the left of said central position, and means for disengaging either of said detent means in response to movement of said steering wheel in a direction opposite to the indicated turn, and yieldable means secured in said housing for moving said ring to neutral position upon disengagement of said detent means.

3. The invention as set forth in claim 2 wherein said disengaging means comprise means actuated by movement of said steering wheel.

4. In a device of the class described, the combination of a steering shaft having a steering wheel secured at one end thereof, depending lug means secured on said steering wheel, a steering column disposed about said steering shaft, a shallow housing disposed concentrically at one end of said column axially adjacent said steering wheel, a multi-positioned switch recessed in said housing at one side thereof, an operating ring swingably mounted in said housing for actuating said switch, yieldable means secured in said housing for urging said ring to a central neutral position, detent means for retaining said ring to the right or left of said central position, said detent means including a pair of spring biased arms adapted for swingable movement about a common pivot on said ring, a pair of rollers mounted in said housing operatively associated with said arms, a notched shoulder portion provided in each of said arms and being so positioned that one of said shoulder portions resiliently engages one of said rollers when said ring is adjusted to the right of said central position and the other of said notched shoulder portions resiliently engages the other of said rollers when said ring is adjusted to the left of said central position, and means carried by said ring for disengaging said detent means in response to movement of said steering wheel, said disengaging means being adapted to release said detent means upon clockwise rotation of said steering wheel when said ring is in the said left hand position of adjustment and by counterclockwise rotation of said steering wheel when said ring is in the said right hand position.

5. The invention as set forth in claim 4 wherein the said means carried by said ring comprises a pair of pawls rotatably mounted on said ring, and means on said pawls adapted to engage said spring biased arms upon rotation of said pawls.

6. The invention as set forth in claim 4 wherein the said means carried by said ring comprises a pair of pawls adapted for yieldable rotation in either direction from a pre-determined neutral position, and finger portions formed on said pawls adapted to engage said detent means to release the latter.

References Cited in the file of this patent

UNITED STATES PATENTS

| | | |
|---|---|---|
| 2,249,120 | Doane et al. | July 15, 1941 |
| 2,249,137 | Hill | July 15, 1941 |
| 2,261,817 | Wilshusen | Nov. 4, 1941 |
| 2,264,225 | Thirwell | Nov. 25, 1941 |
| 2,269,499 | Wharam et al. | Jan. 13, 1942 |
| 2,276,413 | Moore | Mar. 17, 1942 |
| 2,343,355 | Yanchenko et al. | Mar. 7, 1944 |
| 2,608,627 | Paule et al. | Aug. 26, 1952 |
| 2,611,842 | Lybrook et al. | Sept. 23, 1952 |
| 2,642,505 | Hept | June 16, 1953 |
| 2,643,308 | Lincoln et al. | June 23, 1953 |
| 2,691,704 | Lincoln et al. | Oct. 12, 1954 |
| 2,693,511 | Doan | Nov. 2, 1954 |
| 2,725,435 | Cislo | Nov. 29, 1955 |
| 2,731,525 | Redick | Jan. 17, 1956 |
| 2,733,309 | Elliott | Jan. 31, 1956 |